(12) United States Patent
Featherstone et al.

(10) Patent No.: US 8,894,865 B2
(45) Date of Patent: *Nov. 25, 2014

(54) PROCESS FOR DEPLETING CALCIUM AND/OR IRON FROM GEOTHERMAL BRINES

(71) Applicant: Berkshire Hathaway Energy Company, Des Moines, IA (US)

(72) Inventors: John L. Featherstone, El Centro, CA (US); George Furmanski, La Quinta, CA (US)

(73) Assignee: Berkshire Hathaway Energy Company, Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,168

(22) Filed: Nov. 14, 2012

(65) Prior Publication Data

US 2013/0068697 A1 Mar. 21, 2013

Related U.S. Application Data

(63) Continuation of application No. 12/854,824, filed on Aug. 11, 2010, now Pat. No. 8,313,653, which is a continuation of application No. 10/763,357, filed on Jan. 23, 2004, now Pat. No. 7,776,202, which is a continuation of application No. 10/160,809, filed on May 31, 2002, now Pat. No. 6,682,644.

(51) Int. Cl.

| | | |
|---|---|---|
| B01D 21/00 | (2006.01) |
| C02F 1/64 | (2006.01) |
| C02F 1/52 | (2006.01) |
| C22B 47/00 | (2006.01) |
| C02F 1/76 | (2006.01) |
| C02F 1/72 | (2006.01) |
| C25B 1/21 | (2006.01) |
| C22B 3/28 | (2006.01) |
| C22B 3/38 | (2006.01) |
| C02F 1/58 | (2006.01) |

(52) U.S. Cl.
CPC ... *C02F 1/58* (2013.01); *C02F 1/64* (2013.01); *C02F 1/5236* (2013.01); *C22B 47/0081* (2013.01); *C02F 1/76* (2013.01); *C02F 1/722* (2013.01); *C25B 1/21* (2013.01); *C22B 3/0016* (2013.01); *C22B 3/0066* (2013.01)
USPC .......... 210/722; 210/638; 210/639; 210/721; 210/724; 210/726; 423/157; 60/641.2

(58) Field of Classification Search
USPC ....................................................... 210/721
See application file for complete search history.

(56) References Cited

U.S. PATENT DOCUMENTS 2,424,958 A 8/1947 Clemens
3,438,878 A 4/1969 Brown et al.

(Continued)

FOREIGN PATENT DOCUMENTS

EP 0 268 319 5/1992
WO WO-99/14403 3/1999

OTHER PUBLICATIONS

Alexperov et al., Journal of Applied Chemistry of the USSR (1992) 65(12):2342-2344.

(Continued)

*Primary Examiner* — Tony S Soohoo
*Assistant Examiner* — Peter Keyworth
(74) *Attorney, Agent, or Firm* — Morrison & Foerster LLP

(57) ABSTRACT

This invention relates generally to processes for extracting iron and/or calcium from geothermal brines.

20 Claims, 7 Drawing Sheets

(56) References Cited

U.S. PATENT DOCUMENTS

| | | | |
|---|---|---|---|
| 4,042,664 A | 8/1977 | Cardwell et al. |
| 4,051,223 A | 9/1977 | MacKay |
| 4,058,585 A | 11/1977 | MacKay et al. |
| 4,128,493 A | 12/1978 | MacKay et al. |
| 4,224,151 A | 9/1980 | Jost |
| 4,405,463 A | 9/1983 | Jost et al. |
| 4,446,026 A | 5/1984 | Beutier et al. |
| 4,624,704 A | 11/1986 | Byeseda |
| 4,707,227 A | 11/1987 | Higgins |
| 4,830,766 A | 5/1989 | Gallup et al. |
| 5,229,003 A | 7/1993 | Duyvesteyn |
| 5,246,593 A | 9/1993 | Gallup |
| 5,358,643 A | 10/1994 | McClintock |
| 5,358,700 A | 10/1994 | Brown et al. |
| 5,441,712 A | 8/1995 | Duyvesteyn et al. |
| 5,932,086 A | 8/1999 | Kasaaian |
| 5,976,383 A | 11/1999 | Guess et al. |
| 6,156,186 A | 12/2000 | Mueller et al. |
| 6,458,184 B2 | 10/2002 | Featherstone |
| 6,517,701 B1 | 2/2003 | Geisler |
| 6,682,644 B2 | 1/2004 | Featherstone et al. |
| 7,776,202 B2 | 8/2010 | Featherstone et al. |

OTHER PUBLICATIONS

Berenguela, "Manganese for the New Millennium" at http://www.berenguela.com (visited Jul. 6, 2001).
International Search Report for PCT/US03/17116, mailed on Sep. 10, 2003, 3 pages.
Mel'Nik et al., Russian J. of Electrochemistry (1996) 32(2):248-251.
Nathsarma et al., Hydrometallurgy (1997) 45:169-179.

PROCESS FOR DEPLETING CALCIUM AND/OR IRON FROM GEOTHERMAL BRINES

RELATED APPLICATIONS

This application is a continuation of U.S. patent application Ser. No. 12/854,824, filed Aug. 11, 2010, now U.S. Pat. No. 8,313,653, which is a continuation of U.S. patent application Ser. No. 10/763,357, filed Jan. 23, 2004, now U.S. Pat. No. 7,776,202, which is a continuation of U.S. patent application Ser. No. 10/160,809, filed May 31, 2002, now U.S. Pat. No. 6,682,644. Each of these applications is incorporated by reference herein.

TECHNICAL FIELD

The present invention generally relates to a process for extracting manganese from geothermal brines. More particularly, the present invention relates to a liquid-liquid extraction method for separating manganese dioxide form brine using an electrolytic process.

BACKGROUND ART

Manganese in many forms is used in a variety of industrial and other applications. It is the fourth most used metal in terms of tonnage, after iron, aluminum and copper. As a trace element, it is found in the body, and also has a variety of uses in industry. For example, manganese dioxide is used in dry cell batteries, in aluminum cans, and in the electronic components of television sets.

Manganese is most often extracted from seawater and other natural sources, but can also be separated from other metals found in aqueous solutions that are byproducts of many industrial processes. For example, geothermal steam and hot brines are found in naturally occurring, large subterranean reservoirs throughout the world. In many areas where extraction is convenient, the steam and hot brines provide a partially renewable resource for the production of power. The pressurized, hot geothermal brines are extracted from the earth to generate power by using steam flashed off from the brine to power a turbine. Thereafter, metals such as manganese can be extracted from the brine before it is returned to the ground.

One of the general problems encountered with the extraction of metals from aqueous solutions involves changes in pH associated with the exchange of metal ions for hydrogen ions in ion exchange reactions. This causes a progressive lowering of the pH which in turn impedes the efficiency of the process. Attempts to solve this problem have been reported, but their success has been limited. See, for example, U.S. Pat. No. 4,128,493, which reports the use of organic solvents and quaternary ammonium salts to extract metals from acidic solutions.

Other methods for recovering metals such as zinc from geothermal brine include precipitation with sulfides and various combinations of solvent extractions and electromagnetic stripping. However, continuous batch processes using these methods are limited due to scaling of the equipment due to the presence of large amounts of silica.

Manganese is usually extracted in the form of electrolytic manganese dioxide (EMD). Perhaps the most common process being used today for extracting manganese is by mixing the manganese-containing material with sulfuric acid to form a manganese sulfate electrolyte. This intermediate is separated from other metals by precipitation and filtration. Thereafter, the manganese sulfate is subjected to solvent extraction and electrowinning. See, for example, PCT WO 99/14403; and L. A. Mel'nik, et al., *Russian J. of Electrochemistry* 32:248-251 (1996).

The current sulfate process for the production of electrolytic manganese dioxide (EMD) was invented more than seventy years ago in the US. However, it was commercialized in the early 1950's in a move largely driven by the US military seeking higher quality batteries for use in Korea. The standard sulfate process is still the only commercial process for the manufacture of EMD.

The only significant market for EMD is its use in dry cell batteries (small amounts are also consumed in the production of soft ferrites for the electronics industries). Optimum battery performance is based on a combination of chemical, physical and electrical characteristics. However, the key feature of EMD which sets it apart from other manganese dioxides is its crystal structure. This all important characteristic is developed during high temperature aqueous electrolysis, the heart of the EMD manufacturing process. Although a typical specification for EMD might have about 20 components, EMD quality is defined by 4 key criteria: Crystal structure (disordered, hydrated, non-stoichiometric); Chemical purity (minimum 92% $MnO_2$ (remainder essentially water) with key impurities at the single digit ppm level); Density (higher the better, since batteries are fixed volume devices); and Intrinsic discharge capacity (measured in mAh/g MnO2, again higher the better).

The standard sulfate process for EMD has been undergoing continual development since it was first commercialized in the 1950s. See e.g., Nathsarma, et al., *Hydrometallurgy* 45: 169-79 (1997); Alexperov et al., *Journal of Applied Chemistry of the USSR* 65: 2342-44 (1992). These developments have been largely driven by demands for improvements in product quality. However, the key elements of the process are unchanged.

One of the largest challenges facing the EMD industry is waste management. The best manganese ores available to the industry contain only 50% Mn. Insoluble gangue from the ore combined with wet filter cakes from process purification and filtration stages typically generate some 2 to 3 tons of solid waste per ton of EMD product. While manganese occurs widely in nature and is not generally considered a toxic element, solid wastes containing soluble manganese must be immobilized and contained in sealed dump sites to prevent ground water contamination. A large proportion of the worlds EMD capacity is located in environmentally sensitive regions, such as Japan, Europe, USA and Australia. Containment of waste is a major limitation to expansion for many existing producers.

A second limitation of the standard sulfate process is the low current density, typically about 55 $A/m^2$, at which plants must operate, although some plants operate between about 50 $A/m^2$ to 70 $A/m^2$. This is one fifth to one tenth the current density normally associated with metal electrowinning processes. It is known that a chloride electrolyte supports higher current densities for the production of EMD, in the order of 80 to 100 $A/m^2$, improving plant productivity and reducing capital cost per annual product ton. However, a chloride electrolyte system has not yet been adopted.

Accordingly, there is a need for a more efficient process for extracting EMD from various natural and industrial sources that is more compatible with environmental concerns and commercial needs. The present process, based on the recovery of manganese units from liquid brine and electrolysis of a chloride liquor, has the potential to overcome or minimize these two limitations of the standard sulfate process.

DISCLOSURE OF THE INVENTION

Figure 1:
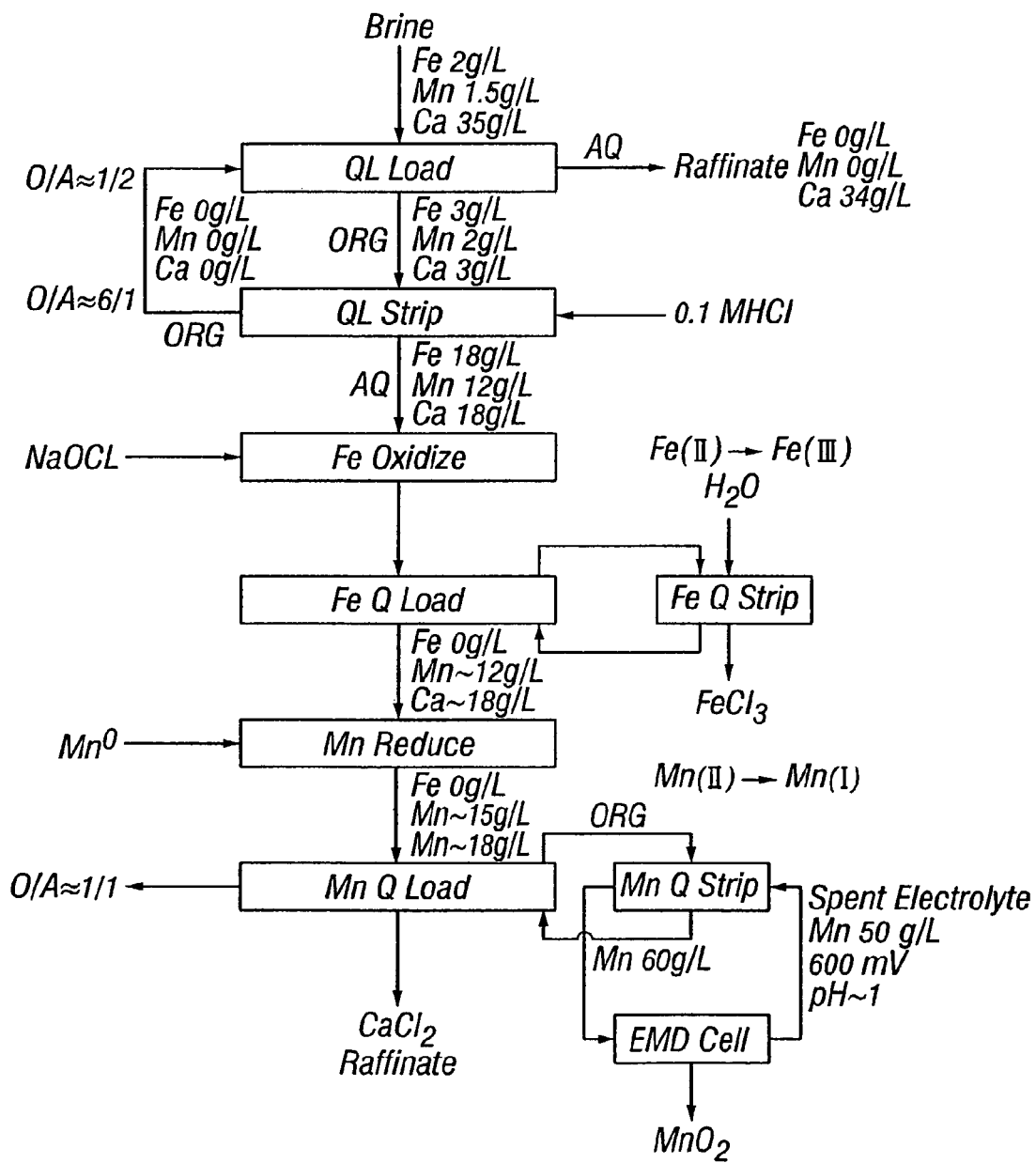
FIG. 1 presents a flow chart depicting a particular embodiment of the disclosed process involving iron removal followed by calcium removal from a brine solution.

The presently described process involves manganese extraction from aqueous brine solutions which may contain iron. The presently described process may also involve extracting manganese from aqueous brine solutions which may contain calcium and/or zinc in addition to iron. The presently described processes further involve methods of producing electrolytic manganese from manganese chloride.

In a particular aspect, the invention utilizes the implementation of the chloride route to electrolytic manganese dioxide (EMD). There are indications that EMD made from chloride solution might be electrochemically superior to EMD made from the standard sulfate route. In addition, the chloride process operates at higher current densities when compared to the sulfate system and this will represent savings in both operating and capital costs. Most geothermal brines are chloride solutions and this makes the chloride route straightforward. However, a method for conversion to the sulfate route is provided if process conditions necessitate a switch from chloride to sulfate.

According to a first aspect of the present invention, a method is provided wherein manganese is extracted from an aqueous solution containing iron, which solution may be a geothermal brine, comprising the steps of: extracting the manganese and iron by contacting the aqueous solution with a QL reagent, wherein the QL reagent comprises a quaternary ammonium compound, a hydrogen ion exchange reagent and an organic solvent, such that an organic phase containing the manganese and iron and an aqueous phase are formed; stripping the manganese and iron from the organic phase by contacting the organic phase with acid, such that the manganese and iron shift from the organic phase to the aqueous phase; removing the iron from the aqueous phase by oxidizing the iron, such that the iron precipitates leaving a supernatant containing the manganese; and electrowinning the supernatant, such that electrolytic manganese dioxide deposits on the anode.

In one embodiment of this aspect of the present invention, the pH of the solution remains constant. An exemplary constant pH of this solution is in the range of about 1 to about 5, about 2 to about 4, and preferably about 1.5 to about 3.

In another embodiment, there is provided a method for manganese extractions where calcium is extracted by introducing manganese-rich strip solution to the organic phase of the manganese and iron extraction step, displacing calcium from the organic phase, and scrubbing the displaced calcium from the solution.

The manganese-rich strip solution described above may be comprised of a side-stream of recycled electrolyte. Further, this solution may contain an organic phase/aqueous phase (O/A) ratio between about 5-20. In one embodiment, the O/A ratio is about 10.

The method described above may also include neutralizing the organic phase during stripping and washing to reform the components of the QL reagent. This generally involves contacting the organic phase with a solution comprised of sodium hydroxide, allowing the aqueous phase and organic phase to separate, discarding the aqueous phase, and then adding di-butyl butyl phosphonate (DBBP) to the organic phase.

In a particular embodiment, during the reformation of the QL reagent described above, the organic phase and sodium hydroxide solution are contacted in an O/A ratio of 1. In a further embodiment of the QL reformation, the organic phase is contacted with a sodium chloride solution or $Na_2SO_4$ solution.

In a particular embodiment of the present invention, a method is provided wherein the supernatant of the oxidation step may comprise manganese chloride.

In one embodiment, the extraction of manganese and iron may be performed in at least one column comprising a closed and pressurized vesicle with fillers contained therein. There may be multiple columns which may be connected in a series such that the product of one column may be transferred to the next for further extraction. These columns may preferably be maintained at a positive air pressure with nitrogen, another inert gas or steam.

In a still further embodiment, all components of the extraction step (described above) are performed under anoxic conditions.

The organic solvent is preferably selected from the group comprising an aliphatic or aromatic hydrocarbon. This organic solvent may preferably be a chlorinated hydrocarbon. In a still further embodiment, the organic solvent may be heptane.

In another embodiment, the quaternary ammonium compound is tricapryl methylammonium chloride (aliquot 336). The hydrogen exchange reagent is preferably diethylhexylphosphate (DEPHA).

The acid used in the extraction step is preferably a non-oxidizing acid. A still further embodiment includes hydrochloric acid or sulfuric acid as non-oxidizing acids.

In addition, during the oxidation step, the pH of the aqueous phase is usually between 2-5.

In another aspect of the method provided herein, iron is oxidized with an oxidizing agent, such as sodium hypochlorite, sodium peroxide, hydrogen peroxide, and chlorine gas. The oxidizing agent may also be combined with a buffer such as sodium carbonate.

In another aspect of the invention, the supernatant from the electrowinning step may be combined with an acid in equal parts to produce an electrolyte bath. The acid may preferably be sulfuric acid or hydrochloric acid.

In yet another aspect of the invention, there is provided a method for extracting manganese from an aqueous solution containing iron, comprising the steps of: obtaining a zinc and calcium depleted hydrochloric acid solution containing manganese and iron; removing the iron from the solution by oxidizing the iron, such that the iron precipitates leaving a supernatant containing the manganese in the form of manganese chloride; and electrowinning the supernatant in a hydrochloric acid bath, such that electrolytic manganese dioxide deposits on the anode.

DETAILED DESCRIPTION

The present invention relates to a process for recovering electrolytic manganese dioxide (EMD) from geothermal brine or from an aqueous solution containing manganese and iron and other components such as, but not limited to, calcium and/or zinc. This process involves solvent extraction to recover manganese from liquid brine, followed by electrolysis of a chloride (or sulfate) liquor. For most commercial uses, EMD should have four basic characteristics; the desired crystal structure, sufficient chemical purity, sufficient density, and adequate intrinsic discharge capabilities.

Extraction of zinc from brine is usually performed prior to the extraction of manganese through classic ion exchange or solvent extraction. Accordingly, two of the principle obstacles for recovering manganese from zinc-depleted brine are the separation of manganese from iron and calcium, and finding an extractant which does not lower the pH of the brine as manganese is extracted. A constant pH is preferred because, as the pH of brine decreases, extraction efficiency for manganese also decreases until, at a pH of about 1.5, manganese extraction is effectively zero.

Process Overview

The process of the present invention can be described in terms of individual process steps as follows:

Extraction: Liquid-liquid anoxic extraction of manganese (and iron) from brine using QL reagent and, optionally, spent electrolyte solution. This may include the subprocesses of loading, scrubbing and stripping.

Oxidation: oxidation to cause the iron to precipitate, which is thereafter removed.

Electrowinning: electrolysis to extract the EMD which is deposited on the cathode.

As the above elements are described by their principal purposes, it is important to note that the order presented is not necessarily the only or even the preferred order in which they may be performed. Further, each step may involve any one, or combination, of a number of subprocesses and the steps and subprocesses may overlap and run into each other. Given any particular embodiment, the process steps may change. Therefore, unless otherwise noted, the presentation of the steps below is provided in a particular order only for ease of understanding and clarity of presentation.

Extraction

As provided below, the extraction step may involve three sub processes: loading, scrubbing and stripping. Each subprocess may be multiply performed in a particular embodiment of the present invention or not performed at all. However, the goal of the steps is to remove impurities or contaminants from the brine solution to aid in obtaining purified manganese therefrom. In a particular embodiment, the geothermal brine that may be used as a starting material is depleted of zinc prior to use in the present processes. Zinc depletion preferably leaves iron and calcium as the primary contaminants in the brine in addition to manganese.

Loading

In one aspect of the extraction step, zinc-depleted and/or iron-depleted brine is contacted with an organic phase QL reagent in a suitable vesicle that can be maintained under anoxic conditions. Anoxic conditions are preferred to prevent the premature precipitation of iron from solution, and the resulting contamination of the solution, due to oxidation of $Fe^{2+}$ to $Fe^{3+}$. These conditions have the additional advantage of preventing the formation of ferric silicate in solution, which would potentially inhibit or complicate the extraction process.

Preferably, the vesicle described above is a column that allows the brine and QL reagent to be mixed together and maintained in a closed environment throughout the extraction process. Such columns are commercially available from, e.g., Koch Process Technologies, Inc., Parsippany, N.J. (Koch columns). The columns may preferably contain "fillers" which are directed to enhancing mass transfer. Suitable column fillers include inert particles and/or other solid matter that does not interfere with the extraction process. The fillers are more preferably moveable reciprocating plates.

Therefore, liquid-liquid extraction Koch columns with reciprocating plates may be used as the principle process equipment in separating manganese from the brine. The Koch columns are multistage contact devices which are more efficient when compared to mixer settler units (which are also contemplated), the dominant type of equipment used in hydrometallurgy. It would require multiple mixer settlers arranged in a series to accomplish the optimal separation, described below, which can effectively be performed in only one of the presently described columns. However, arrangement of a series of Koch columns with reciprocating plates are also contemplated in the present invention to obtain optimum extraction. Suitable columns are sealed pressure vessels which prohibit contact with air (i.e., maintaining anoxic conditions) to avoid premature oxidation of iron. An anoxic environment may be maintained through positive pressure with an inert gas such as nitrogen, or with steam from the geothermal brine solution. Positive pressure refers to maintenance of a pressure within the column above atmospheric pressure. Further, suitable equipment is required which operates effectively at high temperatures, often between about 180° F. to about 250° F., about 230° F., or preferably about 225° F., and avoids significant evaporative loss due to the temperature and pressure. The pressurized liquid-liquid extraction columns described above may be used to accomplish this task. Similar columns are suitable for performing the loading, scrubbing and stripping steps described below.

A preferred extracting compound of the present invention is "QL reagent." (See U.S. Pat. No. 4,128,493.) The QL reagent is a combination of two commercially available chemicals: a quaternary ammonium cation, such as Aliquot 336 (i.e., tricapryl methylammonium chloride) ("Q"), Aldrich Chemical Co., Milwaukee, Wis., and a deprotonated anion, such as DEHPA (i.e., diethylhexylphosphate) ("L"), in a suitable organic solvent. The QL reagent is prepared using known methods. For example, see methods described in U.S. Pat. No. 4,128,493. As described therein, an example of the basic reaction of the QL reagent with a metal salt (MX) can be represented as:

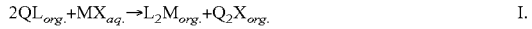

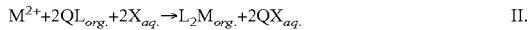

(I) where M is a divalent cation and X is a divalent anion (e.g., sulfate), or (II) where X is a monovalent anion (e.g., chloride). According to either of these equations, there is no net transfer of hydrogen ions from the organic phase to the aqueous phase during extraction. Accordingly, there is no appreciable change in pH. The reagent exists as an ion pair in the organic phase, and extracts Mn, Ca and Fe as the divalent chloride salts ($MnCl_2$, $CaCl_2$ and $FeCl_2$) at a self-buffering pH of about 3.5. The reagent extracts iron and manganese approximately equally and is selective against calcium. However, in solutions with excess concentrations of calcium, the loaded organic phase may contain equal concentrations of all three metals.

Without being bound by theory, suitable quaternary ammonium cations ("Q") for use in preparing the QL reagent may be represented by the following formula:

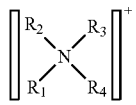

where $R_1$ is a hydrocarbon radical such as alkyl, alkenyl, aryl, alkaryl, arylalkyl and the like of approximately 6 to 24 carbon atoms, where $R_2$, $R_3$ and $R_4$ are hydrocarbon radicals of 1 to 24 carbon atoms. Representative anions $X^-$ and $X^{2-}$ are chloride, bromide, iodide, sulfate, bisulfate.

Suitable quaternary ammonium cations include lauryltrimethyl ammonium chloride, myristyltrimethyl ammonium chloride, palmityltrimethyl ammonium chloride, lauryltrimethyl ammonium sulfate, myristyltrimethyl ammonium bromide, palmityltrimethyl ammonium iodide, stearyltrimethyl ammonium chloride, stearyltrimethyl ammonium sulfate, oleyltrimethyl ammonium chloride, oleylbutyldimethyl ammonium sulfate, dilauryldimethyl ammonium chloride, distearyldimethyl ammonium sulfate, trilaurylmethyl ammonium chloride, tioctylmethyl ammonium bromide, tridecylmethyl ammonium chloride, stearylbenzyldimethyl ammonium sulfate, oleylbenzyldiethyl ammonium chloride and the like. In one embodiment, the quaternary ammonium compound is tricapryl methylammonium chloride ("Aliquot 336") or tetradecylammonium chloride. In examples to follow, the quaternary ammonium salt used was a trialkyl monomethyl ammonium chloride wherein the alkyl groups contained 8 and 10 carbons, such alkyl groups being straight chained and randomly distributed in the quaternary cation.

The deprotonating anion is capable of being deprotonated by reaction with the quaternary ammonium salts and include, for example, alpha-hydroxyoximes, benzophenoximes, beta-diketones, fluorinated beta diketones, benzoxazoles, hydroxyquinolines, organophosphoric acids, and naphthenic acids. As an example, a preferred deprotonating anion includes diethylhexylphosphate (DEPHA) or Cyanex 272 (Bis(2,4,4,-trimethylpentyl)phosphinic acid). Each of these classes of compounds are extensively described in the literature (See e.g., U.S. Pat. No. 4,128,493 and references cited therein) and are readily commercially available.

Both the quaternary ammonium cation and the deprotonating anion are soluble in the water-immiscible organic solvent. Preferably, the solvent is an aliphatic or aromatic hydrocarbon such as the petroleum derived liquid hydrocarbons (e.g. kerosene, fuel oil). Other suitable solvents include, but are not limited to, chlorinated hydrocarbons.

In addition to the three principal components comprising the QL reagent, a phase modifier, such as di-butyl butyl phosphonate ("DBBP"), can also be added to prevent a third phase from forming during the extraction process. A preferable phase modifier has both organic and ionic components so that it may be soluble in both phases. Without being bound by theory, acceptable phase modifiers of the present invention should not interfere with the QL reagent by binding to either component. Additionally, it is preferable that the phase modifier maintains a weaker metal binding capacity than the QL reagent and, by itself, does not have metal binding capacity. Examples of acceptable phase modifiers include DBBP as well as a variety of alcohol-based reagents.

The extraction process may also include multiple stages of using reciprocating columns. In the first reciprocating column stage, zinc depleted geothermal brine may be mixed in one or more columns with an immiscible organic solvent that contains a specific extracting compound to extract calcium and iron, while the manganese loads onto the organic phase.

The optimum pH of the solution during the loading step and subsequent scrubbing and stripping steps is between about 2 to about 5. The temperature of the solution is preferably in the range of about 180° F. to about 230° F. through this step as well. The concentration of the QL reagent introduced may vary but is preferably between about 0.10M to about 0.5M, more preferably about 0.15M, about 0.3M, or about 0.45M to achieve maximum manganese extraction of at least 70% with a minimum amount of calcium extraction resulting.

Scrubbing

As the QL reagent is selective against calcium, in one embodiment calcium may be separated from the organic phase as aqueous calcium raffinate. The organic phase may then be routed to the scrubbing step for removal of remaining calcium. The resulting concentration of calcium remaining in the organic phase is usually below about 13 mg/L, preferably below about 10 mg/L, and more preferably below about 2 mg/L. During scrubbing, the remaining calcium is preferably removed from the organic phase through cation exchange by a combined manganese/hydrogen ion displacement mechanism. Preferably, in this step calcium is separated from the organic phase containing manganese and iron as the primary metal components, if iron had not already been removed. Preferably above about 90% to about 100% of the calcium is removed from the solution in the scrubbing step.

During scrubbing, the loaded organic phase may be processed through the addition of spent electrolyte, preferably $MnCl_2$ or another acidic scrubbing solution, preferably with a high manganese concentration which forms an aqueous phase (between about 40 g/L to about 70 g/L, and preferably about 50 g/L). In this step, the loaded organic phase may be contacted with the spent electrolyte pre-adjusted to a particular pH of between about 1 to about 5, preferably about pH 4, for the initial introduction of spent electrolyte. For subsequent addition of spent electrolyte to the organic phase, the pH of the spent electrolyte is preferably between about 1 to about 5. Additionally, the oxidation potential may be adjusted in the spent electrolyte prior to contact with the organic to between about 300 m/V to about 600 m/V. The reagents useful for the pH adjustment and equilibration of the spent electrolyte or the aqueous phase include, but are not limited to, NaOH and HCl. Methods are known in the art that are useful for performing equilibration of the pH during this step.

The contact between the loaded organic phase and the spent electrolyte may occur at a specific organic phase to spent electrolyte ratio (O/A) ranging from about 20:1 to about 1:2, about 15:1, about 10:1, about 7.5:1, about 5:1, about 1:1, and preferably between about 20:1 to about 5:1. Calcium removal in this step involves a flexible process wherein the maximum calcium separation may be achieved at O/A ratios of less than 20:1.

The scrubbing step may comprise at least one cycle wherein the loaded organic phase is mixed with the spent electrolyte to form an aqueous phase containing calcium, manganese and iron depending on the characteristics of the spent electrolyte and another organic phase containing manganese and iron, depending on the characteristics of the spent electrolyte described above. The characteristics of the spent electrolyte that may affect the consistency of the resulting aqueous and organic phases include pH, oxidation potential, the introductory O/A ratio and metal concentration. The relevant concentrations of pertinent components may be predicted depending on the characteristics of the spent electrolyte added to the system. The cycles used herein may be continuous within a closed system such as that existing within a series of connected Koch columns Preferably, the scrubbing step comprises multiple cycles between about 2 to about 5 cycles, and more preferably about 3 cycles in suitable columns.

In general, two options exist for the organic phase resulting from the addition and mixing of the spent electrolyte in the scrubbing step. Depending on the embodiment being utilized (as described below), the organic phase can be routed to another scrubbing cycle wherein another side-stream of spent electrolyte is introduced and another scrubbing cycle ensues. The side stream may be similar to the side-stream used in the previous scrubbing cycle, or it may vary in one or more factors such as pH, metal concentration, O/A ratio or oxidation potential. The second option for the organic phase above is to be routed to a stripping step, as provided below, for extraction of manganese from the organic phase and reformation and recycling of the QL reagent.

Similarly, options exist for routing of the aqueous phase resulting from the present scrubbing step. This phase may be recycled to the feed stream of brine entering the system, routed to an iron removal step or removed from the system. The spent electrolyte composition and metal concentration of the resulting aqueous phase discussed below may affect where the aqueous phase gets routed to.

Stripping

The stripping step involves treating the organic phase resulting from the scrubbing step(s) with a high O/A concentration of an acidic solution, such as a side stream of acidic spent electrolyte. The pH of the spent electrolyte is preferably about 1. The strip solution, after the addition of the side stream of spent electrolyte, may be comprised of about 70% to about 90% spent electrolyte. The manganese metal concentration in the side stream may be between 40 g/L to about 80 g/L, and more preferably about 50 g/L. Further, the stripping process may be performed through the addition of HCl, or another non-oxidizing acid, rather than (or in addition to), the introduction of a side stream of spent electrolyte. If HCl is used, the concentration is preferably in the range of between 0.05M to about 0.5M. If no spent electrolyte is available, then the use of a non-oxidizing acid is the preferred route. The ratio and concentration of either the acid or the side stream of spent electrolyte introduced to the organic phase solution may vary depending on the amount required to strip the organic phase and reform the QL reagent. Methods known in the art and illustrated in the Examples section are useful for determining these concentrations and volumes.

The end product of the stripping step is the formation of an aqueous phase and an organic phase. Producing these phases involves contacting the organic phase with an aqueous acidic solution and can be illustrated by the following equations (depending on whether a monovalent or divalent anion is used):

Divalent(e.g.,sulfate):$L_2M_{org.}+Q_2X_{org.}+H_2X_{aq.} \rightarrow 2LH_{org.}+Q_2X_{org.}+MX_{aq.}$ Monovalent(e.g.,chloride):$L_2M_{org.}+2QX_{org.}+2H^+ \rightarrow M^{2+}+2LH_{org.}+2QX_{org.}$ As indicated above, at this stage, the metal salt is stripped from the organic phase and ends up in the aqueous phase. Following this step, the organic phase can be reused by neutralization and washing (with $H_2O$) to form the salt of the hydrogen ion exchange reagent and the quaternary ammonium compound (reforming the QL reagent) for use in further metal extractions (See e.g., Example 1). This step may be represented by the following equation:

$HL_{org.}+QX_{org.}+NaOH \leftrightharpoons QL_{org.}+NaX+H_2O$

Suitable acids, compounds or gasses (together "compounds") for use in this step may be any compound that forms a soluble metal salt with manganese. Preferably, these compounds should not be oxidizing compounds (i.e., nitric acid, chlorine gas, hydrogen peroxide, oxygen, air, etc.), and they should not interfere with the QL reagent components. The compound is preferably hydrochloric acid or sulfuric acid.

When hydrochloric acid is used, this step also may induce calcium removal, since calcium chloride is formed and precipitates (depending on whether calcium is removed in prior steps). Alternatively, if sulfuric acid is used instead of hydrochloric acid, an ion exchange or precipitation step can be added prior to oxidation and electrolysis to remove calcium.

Oxidation

During the steps which may optionally take place prior to the present oxidation step, a majority of the iron in the brine co-purifies with the manganese. If so, the iron should be removed from the solution to produce a purified manganese containing solution. The oxidation step involves oxidizing the iron in solution to form an insoluble iron oxide precipitate which can be removed from solution. The agents used in this process, therefore, must be efficient in oxidizing $Fe^{2+}$ to $Fe^{3+}$ and precipitating iron by producing iron oxides.

Examples of suitable oxidizing agents include but are not limited to sodium hypochlorite, sodium hydroxide, hydrogen peroxide, and chlorine gas. When sodium hypochlorite (NaOCl) is used, iron precipitates in the form of akaganeite. The oxidizing agent may also be combined with a buffer such as sodium carbonate. In this aspect, the buffer aids in maintaining the solution pH in the range between about 1.5-5 and also may promote the formation of stable precipitates which can be easily removed. Seed crystals may also be added to the solution in this step to help promote iron precipitation. These seed crystals may be akaganeite crystals added directly to the strip liquor.

Removal of the iron precipitate can be accomplished using any known method, such as settling, filtration, column precipitation and the like.

In one aspect, the oxidation step may be performed in stages to maximize akaganeite precipitation. The stages may vary in pH ranges preferably between 1.7 to about 1.8, about 2.3 to about 2.4, and about 3.4. Oxidation potential also plays a factor in iron oxidation. The concentration and volume of the oxidizing agent may vary stoichiometrically. The oxidizing agent concentration may be determined by routine optimization.

Figure 6:
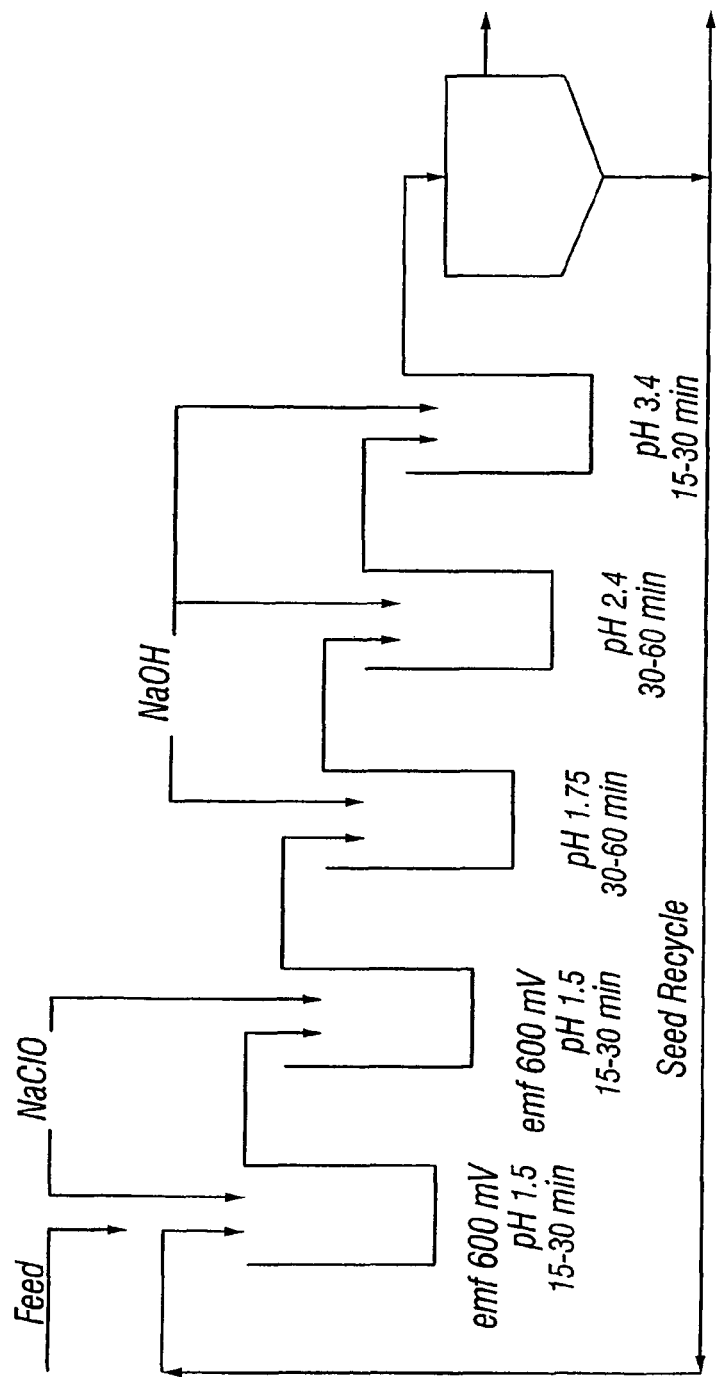
FIG. 6 presents a schematic flowsheet depicting a particular aspect of iron oxidation and precipitation in cascade-arranged tanks.

After the addition of the oxidizing agent and precipitation of iron, the solution should be iron depleted. The concentration of iron remaining in solution may be in the range of about 10% to less than 1%, about 8%, about 5%, about 3%, and preferably about or below 1%. Further, oxidation according to the above description may take place in a series of cascade arranged tanks (See FIG. 6).

After oxidation and precipitation of iron oxides, the iron depleted solution may be further purified by a manganese solvent extraction step wherein remaining iron and other trace metals such as copper and other base metals, which may still exist in solution, are removed. This process preferably involves the addition of a hydrogen exchange reagent such as DEPHA or a Cyanex extractant to the solution. The addition of the extractant causes the formation of $FeCl_2$ (and other metal chlorides) which may be removed. The purified manganese solution may then be routed to electrowinning. The precipitated iron for this step may be recycled to the beginning of the oxidation step for further use as seed material to aid precipitation.

Figure 7:
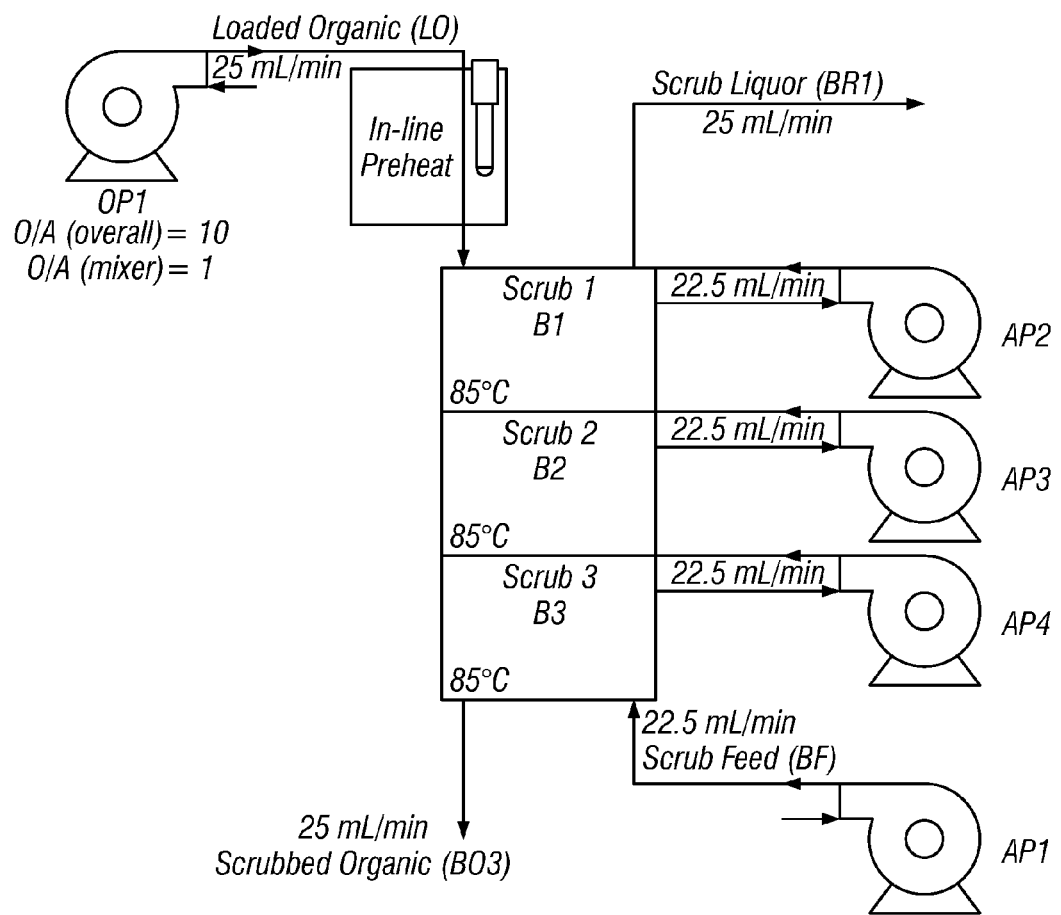
FIG. 7 presents a schematic of the process steps that may be used for iron removal.

FIG. 7 presents a schematic of the process steps that may be used for iron removal.

Electrowinning

To extract electrolytic manganese dioxide from the product of the prior steps, the iron depleted aqueous phase (containing manganese salt) is exposed to an electric current between an anode and cathode. In one embodiment, the anode is composed of a corrugated titanium plate and the cathode is composed of one or more graphite plates or slabs. The current will cause the manganese dioxide to deposit on the anode. The iron depleted aqueous phase ("bath") may contain a manganese concentration between about 40 gms/kg to about 70 gms/kg, and usually contains at least about 50 gms/kg, as well as about a 50 gms/kg concentration of hydrochloric acid. The primary electrolyte for use in the present electrowinning step is hydrochloric acid. The disclosed process involves a chloride route to the electrowinning step. However, the manganese salts of manganese chloride and manganese sulfate may be used in the electrowinning process to produce manganese dioxide (sulfuric acid would be used instead of hydrochloric acid if manganese sulfate is the manganese salt here). However, one of these compounds may be preferred over the other, depending on how the manganese will be used commercially. Therefore, a further embodiment of the present invention relates to converting manganese chloride to manganese sulfate.

Optional Product Finishing

Following the electrowinning step, the manganese dioxide product deposited on the anode is optionally finished to produce a commercial product. This process involves the following steps. First, the anode plates one removed from the electrowinning bath and washed with an aqueous solution (e.g., hot water) to remove any residual acid. These should be allowed to dry. The manganese dioxide may then be removed using mechanical forces such as agitation, flexing, scraping, etc. Finally, the manganese dioxide may be ground, milled and neutralized using known methods. For example, it may be dry ground in a C-E Raymond ring-roller mill with air classifier to a nominal ~100 um.

The neutralization step may involve the following: first, a manganese dioxide slurry is made through the addition of water and a base to bring the pH of the slurry to equal to or greater than 6, since washing the plates during product finishing only removes acid from the exposed surface areas. Accordingly, this step removes occluded and adsorbed acid. Then the final slurry product may be filtered and dried.

The final manganese product is preferably comprised of at least 99% pure manganese dioxide.

Exemplary Method #1

In one embodiment (See FIG. 1), zinc depleted brine is routed to a series of reciprocating Koch columns involving about 6 stages of columns. In a loading phase, QL reagent is then introduced to the brine in one or more columns in a counter current exchange method. The counter current exchange preferably extracts iron, calcium and manganese. Two phases may then be formed comprising an organic phase containing manganese, iron and calcium as the principal components and the aqueous phase containing calcium as the principal component. The aqueous phase may then be separated from the organic phase and removed form the present system. The organic phase is then preferably scrubbed through the introduction of about 0.1 M HCl in an organic to acid ratio of about 6:1. The introduction of the HCl produces two phases, organic and aqueous wherein the principal components of the former organic phase are displaced into a new aqueous phase. In this second set of organic and aqueous phases, the aqueous phase contains iron, manganese and calcium. The organic phase is then routed back to the loading stage.

The aqueous phase may then be routed to an oxidation stage for iron removal. In one embodiment, NaOCl is introduced as the oxidizing agent causing the iron to fall out of solution in the form of insoluble iron or akaganeite. The oxidizing process may preferably occur in several stages of cascade-arranged tanks (see FIG. 6). In these tanks, under strictly controlled oxidation potential (about 600 mV) and pH (pH preferably of about 1.5, about 1.75, about 1.75, or about 3.4, depending on the tank), iron will be oxidized from soluble ferrous to an insoluble ferric form. The time in each tank in the cascade-arranged series may vary, but is preferably between about 15 minutes to about 60 minutes in each tank. It is preferable in this embodiment to use pressure filtration to separate the solid iron precipitate from the aqueous phase. After removal of solid iron from the aqueous phase, the aqueous phase may then be routed to a manganese solvent extraction step. The iron precipitate may then be recycled for use as additional seed material for further iron precipitation.

As provided above, solvent extraction is accomplished through the introduction of DEPHA or a Cyanex extractant to the aqueous phase. These extractants will cause metals such as soluble iron to form $FeCl_2$. The $FeCl_2$ may then be stripped from the extractant through the addition of water. The resulting solution may then be routed to a manganese reduction step involving the introduction of free state manganese. At this point in the process, calcium may still exist in solution. To remove remaining calcium another loading stage may be undertaken wherein Q is added in an O/A ratio of about 1:1. In this step, the remaining manganese is loaded onto the organic phase, displacing calcium which forms CaCl2 in an aqueous phase which may be removed from the system. The manganese is then stripped from the organic phase through the addition of a side stream of spent electrolyte from electrowinning containing a concentration of about 50 g/L manganese at a pH of about 1.

The resulting manganese containing solution may then be routed to an electrowinning step wherein manganese dioxide is deposited. The manganese dioxide is then preferably refined into about 95% to about 100%, about 97%, about 98%, and preferably about 99% pure manganese through the product finishing steps described above.

Exemplary Method #2

Figure 2:
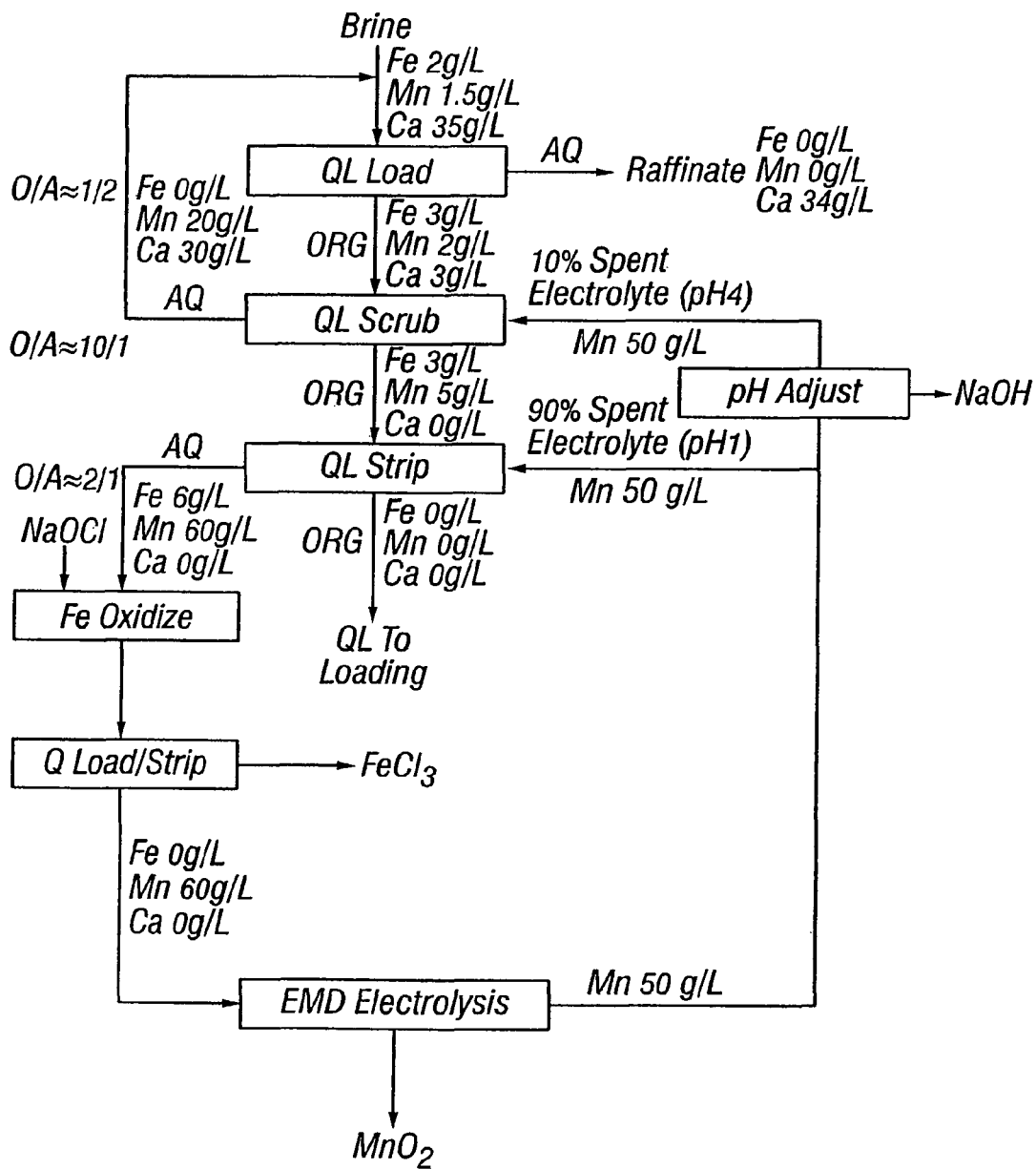
FIG. 2 presents a flow chart depicting another particular embodiment of the disclosed process involving impurity removal of iron and calcium after primary solvent extraction.

In another embodiment (See FIG. 2), the extraction process requires about 6 stages of reciprocating columns. In the first reciprocating column stage, zinc depleted geothermal brine is mixed in one or more columns with an immiscible organic solvent that contains a specific extracting compound (QL reagent). Herein, a counter current extraction of manganese, calcium and iron takes place and the manganese loads onto the organic phase. The organic loaded phase is then preferably scrubbed in more that one column through the addition of a small side-stream of spent or recycled electrolyte, which is preferably manganese-rich, to aid in the displacement of calcium. This side stream may be introduced in a concentration of about 10% spent electrolyte to about 90% organic phase at a pH of about 4 and containing a manganese concentration of about 50 g/L. The pH of the side stream may preferably be adjusted through known methods, e.g., the addition of NaOH, to the desired pH prior to introduction to the organic phase. The spent electrolyte may be obtained from the electrowinning step. Depending on the manganese content, the aqueous phase that forms as a result of the addition of the side stream of spent electrolyte may be either discarded or recycled to the brine feeding the column for further loading. A measurable manganese content usually indicates that recycling is preferable. This scrubbing step preferably depletes the organic phase of calcium.

Subsequent to scrubbing, the scrubbed organic phase may be routed to a stripping step useful for stripping the manganese and iron from the organic phase and into the aqueous chloride phase. This step may comprise the introduction of spent electrolyte to the scrubbed organic in a concentration of about 90% spent electrolyte to about 10% organic phase. Preferably, the spent electrolyte is at a pH of about 1 and the manganese concentration of the electrolyte is about 50 g/L. At this point, the QL reagent used in the loading step is reformed through neutralization and washing to form the salt of the hydrogen ion exchange reagent and the quaternary ammonium compound (reforming the QL reagent) for use in further metal extractions. The QL reagent may be reused many times, usually over about 500 times, through the disclosed reformation methods.

Further to the stripping step, the aqueous phase may preferably be routed to a step for iron removal comprising oxidation and manganese chemical extraction. Other embodiments of these steps are discussed above. When iron is removed from the aqueous phase and the solution contains an appropriate concentration of manganese for electrowinning (see above), the chloride solution containing manganese is routed to the electrowinning step wherein manganese dioxide is deposited.

Exemplary Method #3

Figure 3:
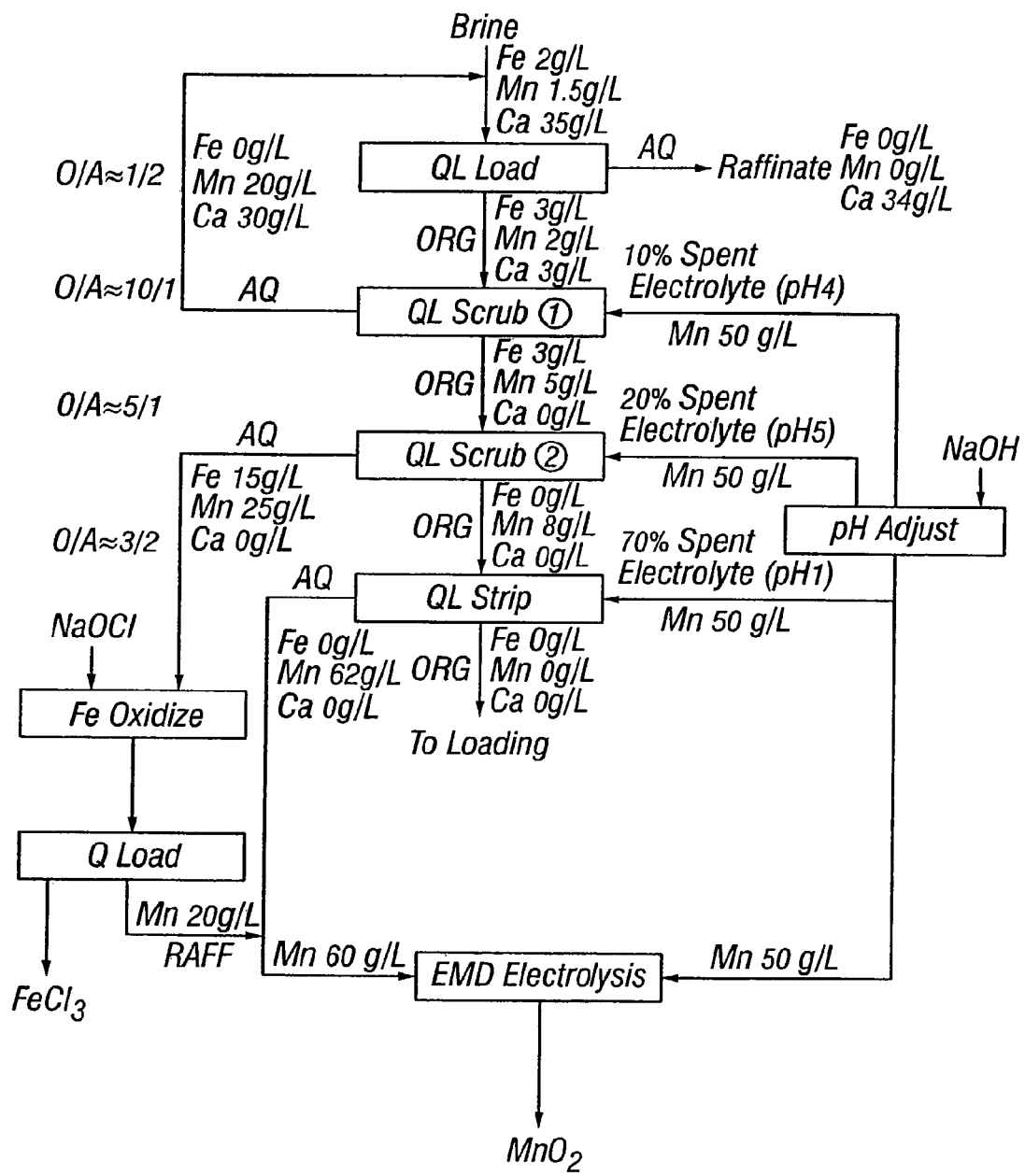
FIG. 3 presents a flow chart depicting yet another particular embodiment of the disclosed process involving multiple scrubbing steps utilizing spent electrolyte and pH adjustment.

In another embodiment (See FIG. 3), the loaded organic phase treatment may be the following. The loaded organic phase is scrubbed with a small bleed stream (5-15%) of spent electrolyte (pre-neutralized to pH 4) to displace calcium. Depending on the manganese content of the bleed, it could be either discarded or recycled to the brine feed to the QL solvent extraction. The organic phase is preferably depleted of zinc at the end of this scrub. In this embodiment, the scrubbed organic is then scrubbed again with spent electrolyte introduced at a concentration of about 15-25% spent electrolyte at a neutralized pH of about 5. The scrubbed organic phase is then routed to a stripping step for a final removal of manganese and reformation of the QL reagent. The aqueous phase is then routed to oxidizing and manganese extraction steps where the iron precipitates as akaganeite and $FeCl_3$ and a manganese chloride solution results. The manganese chloride solution may then be combined with the aqueous phase containing manganese resulting from the stripping step discussed above. Further, these two solutions may be combined to form the electrowinning bath. This combined solution may be used in electrowinnning to form manganese dioxide. As a final step, product finishing may be undertaken in accordance with the steps described above.

Exemplary Method #4

Figure 4:
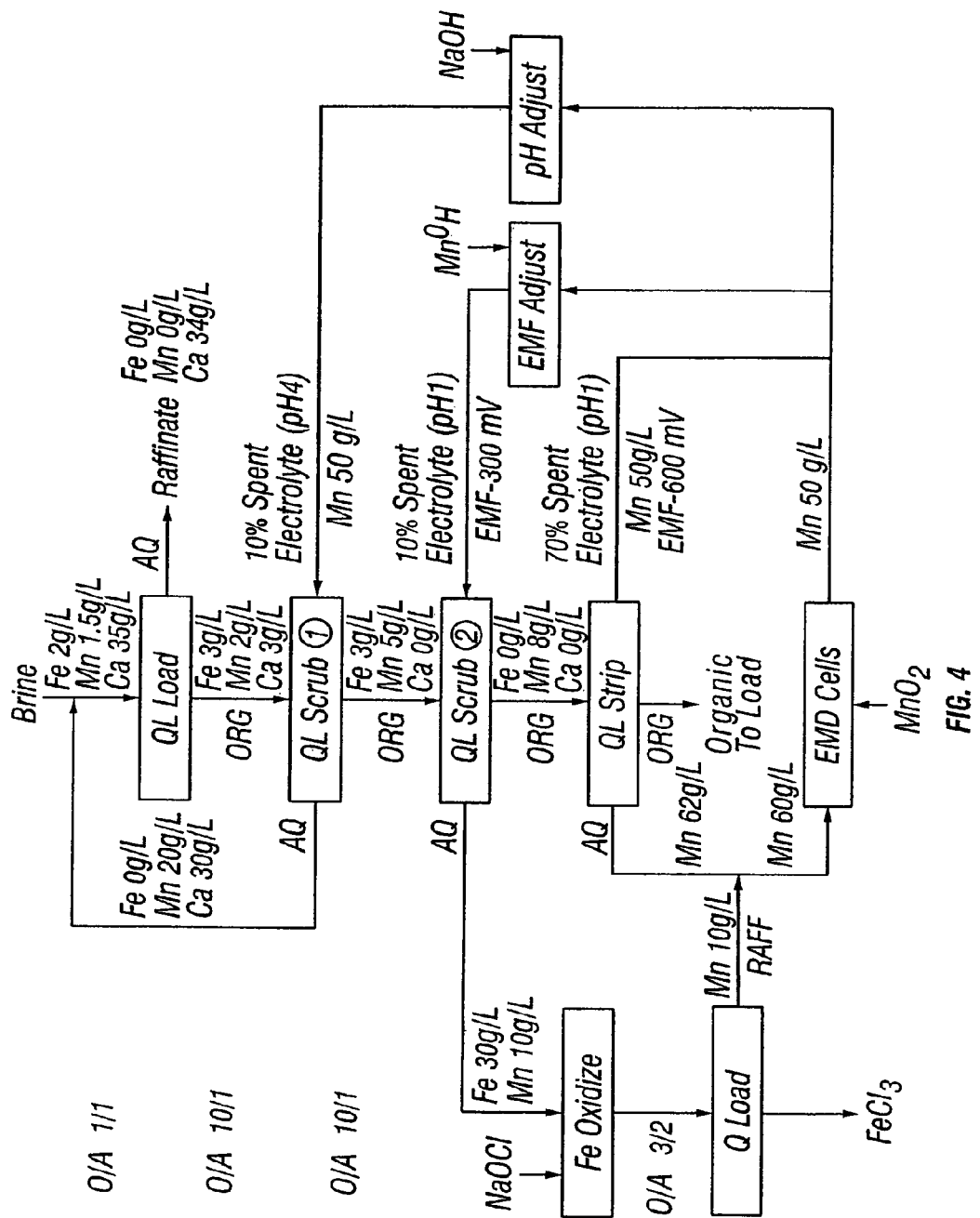
FIG. 4 presents a flow chart depicting yet another particular embodiment of the disclosed process involving multiple scrubbing steps utilizing spent electrolyte pH and EMF adjustment.

In a further embodiment (See FIG. 4), the same preliminary loading and scrubbing steps are utilized to remove calcium from the loaded organic. In addition, in this embodiment a second scrubbing stage is included in which the loaded organic is treated with a small bleed stream (10-20%) of spent electrolyte that has been reduced to ~300 mV with manganese metal, and the pH adjusted (if necessary) to ~pH 1. In this scrubbing stage, iron is stripped from the organic because of the low pH, but manganese remains loaded (switching from DEPHA to Aliquot 336) because of the formation of anionic manganese chloride. Depending on the manganese content of the scrub solution, it would either be discarded or treated to separate iron and manganese.

Further to the second scrubbing, the aqueous phase may be routed to the steps described for iron removal and the organic phase may be routed to a stripping step for stripping of the remaining manganese from the organic and reformation of the QL reagent. In this embodiment, the stripping step involves contact of the organic phase with a concentration of about 60-80%, preferably 70%, spent electrolyte at a pH of about 1, a manganese concentration of about 50 g/L and an EMF of about 600 mV. The aqueous phase resulting from contact of the spent electrolyte with the organic phase which contains manganese should then be routed to the electrowinning step for manganese dioxide production.

Exemplary Method #5

Figure 5:
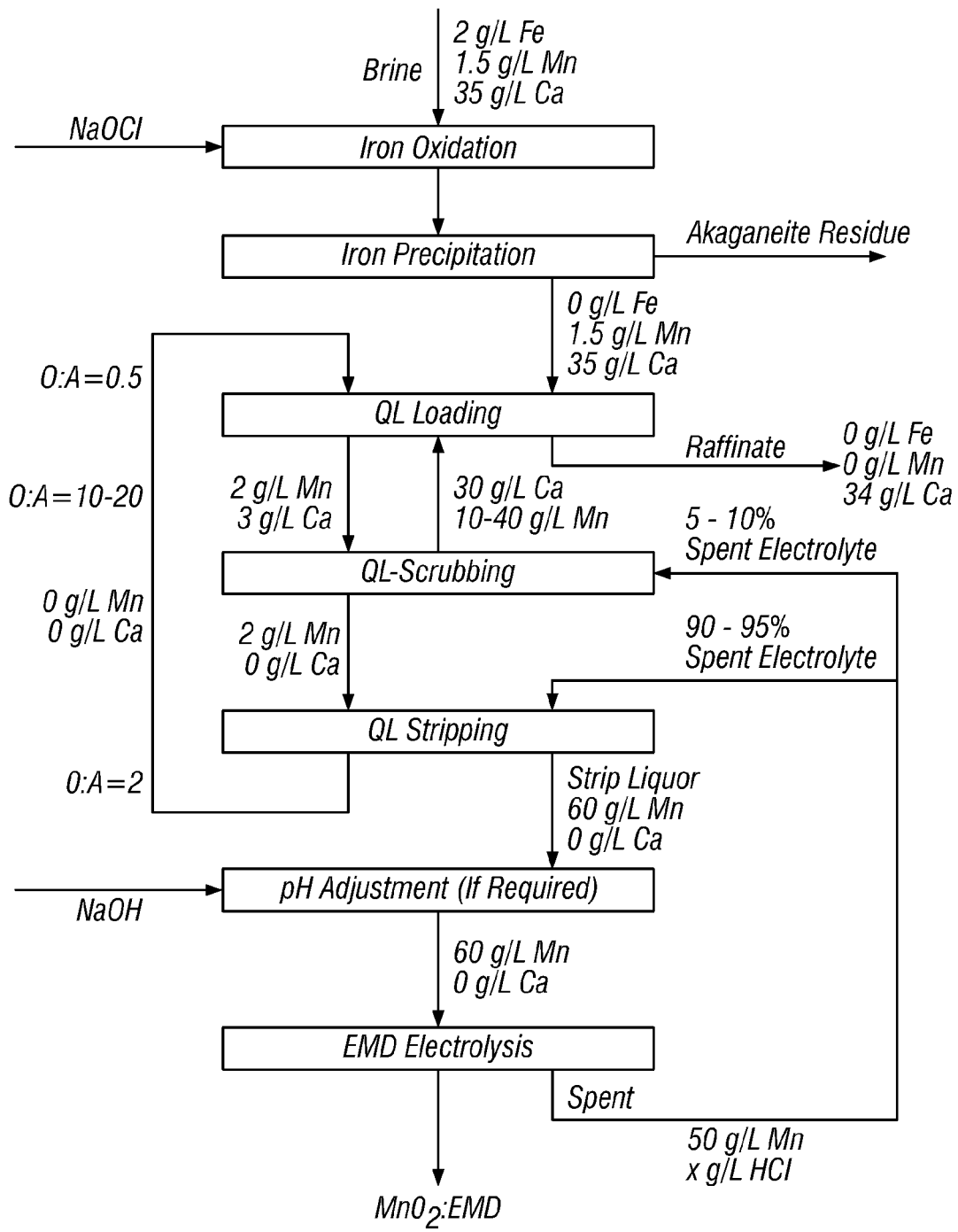
FIG. 5 presents a flow chart depicting yet another particular embodiment of the disclosed process involving iron removal prior to QL loading.

In a still further embodiment (See FIG. 5), iron is removed from the brine solution prior to loading of the QL reagent. In this embodiment, NaOCl is contacted with the brine solution thus causing akaganeite formation and precipitation from solution. This akaganeite residue may then be removed through methods known in the art, such as pressure filtration. The iron depleted brine solution is then routed to QL loading where manganese and calcium load onto the organic. The aqueous phase thus formed containing an elevated concentration of calcium may then be discarded. Calcium may then be scrubbed from the organic phase through the introduction of about 5-10% spent electrolyte (at a pH of about 1). The aqueous phase may then be routed back for further QL loading or discarded, depending on the concentration of manganese in this solution. The organic phase may then be routed to a stripping step wherein about 90-95% spent electrolyte (at a pH of about 1) is contacted with the organic phase, the manganese is then displaced into the aqueous phase and the QL reagent may then be reformed through neutralization and washing. In this embodiment, the aqueous phase may then require additional pH adjustment, through the addition of NaOH, to place the solution in a proper pH for electrowinning. The solution may then be routed to electrowinning and optional product finishing.

All references cited herein are hereby incorporated by reference in their entireties, whether previously specifically incorporated or not. As used herein, the terms "a", "an", and "any" are each intended to include both the singular and plural forms.

Having now fully described this invention, it will be appreciated by those skilled in the art that the same can be performed within a wide range of equivalent parameters, concentrations, and conditions without departing from the spirit and scope of the invention and without undue experimentation.

While this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

We claim:

1. A method of depleting calcium from a geothermal brine solution, said method comprising:
   (a) contacting the geothermal brine solution with a QL reagent to create a reaction solution, wherein the QL reagent comprises a quaternary ammonium compound, a hydrogen ion exchange reagent, and an organic solvent, wherein the reaction solution comprises an organic phase and an aqueous phase, and wherein the reaction solution is maintained at a temperature in the range of about 180° F. to about 230° F.;

(b) extracting calcium into the aqueous phase, wherein the organic phase becomes a calcium-depleted geothermal brine solution;

(c) separating the aqueous phase from the organic phase; and (d) removing additional calcium from the calcium-depleted geothermal brine solution by extracting the calcium-depleted geothermal brine solution with an aqueous acidic scrubbing solution to form a scrubbed organic phase, wherein the aqueous acidic scrubbing solution has a manganese concentration of about 40 g/L to about 70 g/L.

2. The method of claim 1, wherein the aqueous acidic scrubbing solution has a pH of between about 1 to about 5.

3. The method of claim 1, wherein the aqueous acidic scrubbing solution has a pH of about 4.

4. The method of claim 1, wherein the aqueous acidic scrubbing solution has an oxidation potential of between about 300 m/V and about 600 m/V.

5. The method of claim 1, wherein said extracting step is performed by mixing the calcium-depleted geothermal brine solution and the aqueous acidic scrubbing solution in a mixing ratio of about 20:1 to about 5:1.

6. The method of claim 1, step (d) is performed between two and five times.

7. The method of claim 1, further comprising:
(e) extracting the scrubbed organic phase with an aqueous acidic stripping solution and isolating a stripped organic phase and a residual aqueous phase.

8. The method of claim 7, wherein the acidic stripping solution is a manganese electrolyte solution with a manganese metal concentration between about 40 g/L and about 80 g/L, or a non-oxidizing acid, or a combination thereof.

9. The method of claim 8, wherein the acidic stripping solution has (a) a pH of about 1, (b) a mixing ratio of the scrubbed organic phase to the acidic stripping solution of about 3:7 to about 1:9, or (c) a pH of about 1 and a mixing ratio of about 3:7 to about 1:9.

10. The method of claim 1, wherein the geothermal brine solution is a zinc-depleted geothermal brine solution.

11. The method of claim 1, wherein the geothermal brine solution is an iron-depleted geothermal brine solution.

12. The method of claim 1, further comprising, prior to step (a), a step comprising contacting an iron-containing geothermal brine solution with an oxidizing agent, wherein said oxidizing agent oxidizes soluble iron in the solution to form an insoluble iron oxide precipitate, and removing the iron oxide precipitate from the solution to form the geothermal brine solution.

13. The method of claim 12, wherein the oxidizing agent is selected from the group consisting of sodium hypochlorite, sodium hydroxide, hydrogen peroxide, or chlorine gas.

14. The method of claim 7, further comprising:
(f) contacting the residual aqueous phase with an oxidizing agent, wherein said oxidizing agent oxidizes soluble iron in the residual aqueous phase to form an insoluble iron oxide precipitate, and removing the iron oxide precipitate from the residual aqueous phase to form an iron-depleted residual aqueous phase.

15. The method of claim 14, wherein the oxidizing agent is sodium hypochlorite, sodium hydroxide, hydrogen peroxide, or chlorine gas.

16. A method of depleting iron from a geothermal brine solution, said method comprising:
(a) contacting the geothermal brine solution with an oxidizing agent, wherein said oxidizing agent oxidizes soluble iron in the solution to form an insoluble iron oxide precipitate;

(b) removing the iron oxide precipitate from the solution to form an iron-depleted geothermal brine solution;

(c) contacting the iron-depleted geothermal brine solution with a QL reagent to create a reaction solution, wherein the QL reagent comprises a quaternary ammonium compound, a hydrogen ion exchange reagent, and an organic solvent, wherein the reaction solution comprises an organic phase and an aqueous phase, and wherein the reaction solution is maintained at a temperature in the range of about 180° F. to about 230° F.;

(d) extracting metal components into the aqueous phase, wherein the organic phase becomes a impurity-depleted geothermal brine solution; and (e) separating the aqueous phase from the organic phase.

17. The method of claim 16, wherein the metal components are calcium, manganese, or zinc metal components, or a combination thereof.

18. The method of claim 16, wherein the oxidizing agent is sodium hypochlorite, sodium hydroxide, hydrogen peroxide, or chlorine gas.

19. The method of claim 16, wherein the iron precipitates as iron akageneite.

20. A method for recycling a quaternary ammonium compound in a QL reagent, said method comprising:
(a) contacting a geothermal brine solution with a QL reagent to create a reaction solution, wherein the QL reagent comprises the quaternary ammonium compound, a hydrogen ion exchange reagent, and an organic solvent, wherein the reaction solution comprises an organic phase and an aqueous phase;

(b) extracting metal components of the geothermal brine into the aqueous phase and the QL reagent into the organic phase;

(c) separating the aqueous phase from the organic phase; and (d) neutralizing and washing the organic phase to reform the quaternary ammonium compound, wherein the reformed quaternary ammonium compound may be used in a subsequent geothermal brine extraction.

* * * * *